UNITED STATES PATENT OFFICE 2,689,794

FUSED MINERAL COMPOSITION AND METHOD OF MAKING SAME

Leyman E. Jackson, Oak Park, Ill., assignor to Victor Chemical Works, a corporation of Illinois No Drawing. Application June 9, 1951,
Serial No. 230,837

13 Claims. (Cl. 99—2)

This invention relates to a fused mineral composition and a method of producing same.

Reference is had to the co-pending application of W. H. Woodstock, Serial No. 155,779, filed April 13, 1950, now Patent No. 2,657,992, which discloses a fused manganese, ferrous, phosphate composition in clinker form readily soluble in phosphoric and other inorganic acids. When finely divided, as by crushing and milling, it may be used directly in stock feed mixtures or incorporated in pressed salt blocks for animal use as salt licks in amounts sufficient to supply the desired nutritional requirements of iron, phosphorus and manganese.

In addition to iron, phosphorus and manganese, such trace elements as copper, cobalt and zinc are often necessary as a mineral supplement in the diets of animals, fowl, and humans. Normally, the amount of mineral supplements required in the diet is quite small and this presents the difficult problem of uniformly distributing the trace elements in a suitable food product. Furthermore, proportions of the various mineral elements need to be varied over a fairly wide range to meet individual nutritional requirements. In the past it has been customary to first mix the individual mineral constituents with one of the minor food ingredients such as salt or sugar. However, the problem of obtaining uniform distribution in the case of the elements copper, cobalt and zinc remains because the amount of these elements required in the diet normally represents less than .1% of the salt or sugar dietary requirements.

My invention solves these difficulties. I have produced a fused reaction product wherein a minor proportion of the trace elements copper, cobalt and zinc are homogeneously dispersed or combined with major proportions of iron, manganese and phosphorus. In brief, certain copper, cobalt and zinc compounds in the desired ratios are finely ground, thoroughly mixed with fine grindings of ferrophosphorus and pyrolusite, and the mixture heated to form a fused reaction product. Generally, the reaction is exothermic, but this is dependent upon definite proportions of the mineral elements as disclosed hereinafter. When this product is finely ground and thoroughly mixed with animal feed, for example, the intake by the animal includes all of the mineral components uniformly distributed in a predetermined desirable ratio.

The term "ferrophosphorus" includes a number of iron phosphides or mixtures thereof and is usually produced in the production of phosphorus by thermal methods. Commercially available ferrophosphorus will range in phosphorus content from 18–27% and generally from about 22–25%.

Pyrolusite is a naturally occurring manganese ore, generally containing from 80–90% manganese dioxide ($MnO_2$). Manganese ores containing much lower contents of manganese dioxide may be employed although in general such ores are less desirable than those having a minimum $MnO_2$ content of 80%.

The copper, cobalt and zinc compounds employed may be in the form of carbonates, oxides, phosphides, phosphates, sulfides, sulfates, etc., but it is preferred to employ the carbonates and oxides.

In one method of carrying out my invention, finely ground ferrophosphorus and manganese dioxide (in the form of a pyrolusite) is thoroughly mixed with a minor proportion of finely ground copper, cobalt and zinc carbonates or oxides in amounts sufficient to supply the normal nutritional requirements of iron, manganese, phosphorus, copper, cobalt and zinc in the diet.

In the production of my fused reaction mineral product, it is necessary that the manganese dioxide be present in a major amount to prevent reduction of some of the metal compounds to elemental metals and sufficient ferrophosphorus must be present to insure an exothermic fusion reaction. It is preferred that the starting mixture consist of at least 50% and preferably 60% of manganese dioxide as pyrolusite and about 15–30% ferrophosphorus, the combined amount of the two materials representing approximately 70–90% of the mixture. The combined amount of copper, cobalt and zinc compounds plus any additional iron oxide introduced may represent from about 10–30% of the mixture.

In a typical example, 58.3% pyrolusite, 19% ferrophosphorus, 17.8% copper carbonate, 3.7% cobalt carbonate and 1.2% zinc oxide in finely milled powder form were thoroughly mixed and the mixture placed in a brick-lined trough. A gas flame was placed at one end until the mixture ignited. Reaction took place with incipient fusion at red heat and rapidly spread throughout the charge to form a homogeneous fused clinker.

In another example, a mixture of finely powdered pyrolusite (61.9%), ferrophosphorus (20%), copper oxide (12.8%), cobalt carbonate (4%), and zinc oxide (1.3%) were thoroughly mixed and the mixture placed in a brick-lined trough, ignited and burned without additional supply of external heat to form a homogeneous fused clinker.

The production of a fused reaction product most suitable for dietary purposes often requires that the ratio or proportions of one element with respect to another be increased. This is readily achieved by varying the proportions of mineral components in the powdered starting mixture. In addition, it is often desirable to have larger proportions of iron in the product than is possible to introduce by the use of ferrophosphorus. This can be accomplished by introducing certain compounds of iron, as for example iron oxide. In a typical example, a mixture of finely powdered pyrolusite (54.7%), ferrophosphorus (17.8%), ferric oxide (6.3%), copper carbonate (16.8%), cobalt carbonate (3.3%) and zinc oxide (1.1%) was placed in a brick-lined trough and a gas flame placed at one end until the mixture ignited. Reaction took place with incipient fusion at red heat to form a fused clinker product. After cooling and milling, the clinker product analyzed approximately:

| | Percent |
|---|---|
| Manganese | 32 |
| Iron | 18.6 |
| Phosphorus | 5.2 |
| Copper | 8.7 |
| Cobalt | 1.4 |
| Zinc | .7 |

The product was soluble in a .25% HCl solution indicating complete solubility in the gastric juices of the stomach which contain from .2 to .3% of free HCl. Feeding tests show the mineral components of the reaction product to be nutritionally available.

The relative proportions of copper to cobalt to zinc in my reaction mixture are not critical; however, it is preferred that these materials not exceed 30% by weight of the total reaction mixture in order to facilitate the exothermic fusion reaction. It is to be noted that from the standpoint of supplying the average mineral requirements of animal diets, the proportion of mineral constituents in the above examples may be assumed as typically illustrative, but it is to be understood that the present invention is not limited to such proportions. They may be varied to meet the individual mineral requirements for the animal, fowl, or human diet. This means that in the event that greater proportions of $MnO_2$, copper, cobalt and zinc to ferrophosphorus are required than specified above, a fused reaction product can be made provided external heating is supplied during the reaction period.

The foregoing detailed description is given for clearness of understanding only and no unnecessary limitations should be understood therefrom as modifications will be obvious to those skilled in the art.

I claim:

1. As a new composition of matter, a fusion reaction product comprising essentially from about 70 to 90% by weight of ferrophosphorus and pyrolusite and from about 10 to 30% by weight of inorganic compounds of copper, zinc and cobalt, wherein said inorganic compounds are selected from the group consisting of carbonates, oxides, phosphides, phosphates, sulfides and sulfates, and at least 50% by weight of the mixture being pyrolusite.

2. A fusion reaction product comprising essentially from about 70 to 90% by weight ferrophosphorus and manganese dioxide and from about 10 to 30% by weight of inorganic metal compounds selected from the group consisting of copper, cobalt, zinc and iron, wherein the copper, cobalt, zinc and iron inorganic compounds are selected from the group consisting of carbonates, oxides, phosphides, phosphates, sulfides and sulfates.

3. A composition of matter comprising a homogeneous fused mixture of from about 70 to 90% by weight of iron and manganese compounds and from about 10 to 30% by weight of copper, cobalt and zinc in the form of manganous, ferrous, copper, zinc and cobalt oxides and phosphates.

4. As a mineral supplement composition of matter, a fusion reaction product of a mixture comprising approximately 50–60% by weight pyrolusite, approximately 15–30% by weight ferrophosphorus, and approximately 10–30% by weight of a mixture of copper, cobalt and zinc compounds selected from a group consisting of carbonates, oxides, phosphides, phosphates, sulfides and sulfates.

5. As a mineral supplement composition of matter, a fusion reaction product of a mixture comprising approximately 50–60% by weight pyrolusite containing at least 80% $MnO_2$, 15–30% by weight ferrophosphorus, and approximately 10–30% by weight of a mixture of iron, copper, cobalt and zinc compounds selected from the group consisting of carbonates, oxides, phosphides, phosphates, sulfides and sulfates.

6. A fused reaction product of a starting mixture comprising from 70–90% by weight of ferrophosphorus and pyrolusite, there being at least 50% by weight of ferrophosphorus, and 10–30% by weight of a mixture of iron oxide, copper carbonate, cobalt carbonate, and zinc oxide.

7. The fused reaction product of claim 6 wherein the pyrolusite contains at least 80% $MnO_2$.

8. The fused reaction product of claim 6 wherein at least 1% of each of the compounds of the metals copper, cobalt, and zinc is present in the mixture.

9. A method of producing a fused mineral supplement composition comprising mixing from about 70 to 90% by weight of finely divided pyrolusite and ferrophosphorus with from about 10 to 30% by weight of finely divided copper, cobalt and zinc inorganic compounds and heating the mixture at a temperature and for a period of time sufficient to produce a homogeneous, fused reaction product, the copper, cobalt and zinc inorganic compounds being selected from the group consisting of carbonates, oxides, phosphides, phosphates, sulfides and sulfates.

10. The method of claim 9 wherein the ingredients of the reaction are in a proportion sufficient to support an exothermic reaction.

11. The method of claim 9 wherein the ingredients include approximately 50–60% pyrolusite, 15–30% ferrophosphorus and 10–30% of a mixture of copper, cobalt and zinc oxides and carbonates.

12. The method as set forth in claim 9 wherein the reaction is carried on to form a fused clinker.

13. A method of producing a fused mineral supplement composition comprising mixing from about 70 to 90% by weight of finely divided ferrophosphorus and pyrolusite containing at least 80% $MnO_2$, and from about 10 to 30% by weight of inorganic compounds of iron, copper, cobalt and zinc selected from the group consisting of oxides, carbonates, sulfides, sulfates, phosphides, and phosphates, and heating the mixture at a temperature and for a period of time sufficient to produce a homogeneous fused reaction product.

No references cited.